(12) United States Patent
Kümmlee

(10) Patent No.: US 11,031,836 B2
(45) Date of Patent: Jun. 8, 2021

(54) STATOR FOR AN ELECTRICAL ROTATING MACHINE

(71) Applicant: SIEMENS AKTIENGESELLSCHAFT, Munich (DE)

(72) Inventor: Horst Kümmlee, Berlin (DE)

(73) Assignee: SIEMENS AKTIENGESELLDCHAFT, Munich (DE)

( * ) Notice: Subject to any disclaimer, the term of this patent is extended or adjusted under 35 U.S.C. 154(b) by 0 days.

(21) Appl. No.: 16/642,705

(22) PCT Filed: Aug. 1, 2018

(86) PCT No.: PCT/EP2018/070838
§ 371 (c)(1),
(2) Date: Feb. 27, 2020

(87) PCT Pub. No.: WO2019/042690
PCT Pub. Date: Mar. 7, 2019

(65) Prior Publication Data
US 2020/0235626 A1 Jul. 23, 2020

(30) Foreign Application Priority Data
Aug. 29, 2017 (EP) .................. 17188366

(51) Int. Cl.
*H02K 3/24* (2006.01)
*B63H 21/17* (2006.01)
(Continued)

(52) U.S. Cl.
CPC ............... *H02K 3/24* (2013.01); *B63H 21/17* (2013.01); *H02K 3/345* (2013.01); *H02K 3/50* (2013.01)

(58) Field of Classification Search
CPC .......... B63H 21/17; H02K 3/24; H02K 3/345; H02K 3/50; H02K 15/00
See application file for complete search history.

(56) References Cited

U.S. PATENT DOCUMENTS 1,653,784 A * 12/1927 Roebel .................... H02K 3/14
310/213
2,896,102 A * 7/1959 Bucklew .................. H02K 3/14
310/213
(Continued)

FOREIGN PATENT DOCUMENTS

CA 2963950 A1 4/2016
DE 19914042 A1 10/2000
(Continued)

OTHER PUBLICATIONS

PCT International Examination Report and Written Opinion of International Examination Authority dated Oct. 18, 2018 corresponding to PCT International Application No. PCT/EP2018/070838 filed Aug. 1, 2018.

*Primary Examiner* — S. Joseph Morano
*Assistant Examiner* — Jovon E Hayes
(74) *Attorney, Agent, or Firm* — Henry M. Feiereisen LLC

(57) ABSTRACT

A stator for an electrical rotating machine, in particular for use in a pod drive, includes a laminated stator core having coils. Each coil has a groove portion, a winding overhang portion and a connecting portion. The winding overhang portion is configured as a stator winding overhang board arranged at an end face of the laminated stator core and having an insulating main body and conducting tracks integrated into the insulating main body. Each conducting track is formed by a number of partial conducting tracks that are electrically insulated from each other. Conductors extend in the groove portion, with each conductor formed by a
(Continued)

number of partial conductors that are electrically insulated from each other, wherein each of the conductors and an associated one of the conducting tracks of the winding overhang portion are electrically conductively connected in the connecting portion.

20 Claims, 5 Drawing Sheets

(51) Int. Cl.
*H02K 3/34* (2006.01)
*H02K 3/50* (2006.01)

(56) References Cited

U.S. PATENT DOCUMENTS

| | | | | |
|---|---|---|---|---|
| 4,080,543 | A * | 3/1978 | Takahashi | H02K 3/04 |
| | | | | 174/108 |
| 6,485,339 | B1 * | 11/2002 | Hartig | B63H 5/125 |
| | | | | 440/6 |
| 7,018,249 | B2 * | 3/2006 | Ries | F01P 3/12 |
| | | | | 440/6 |
| 7,269,890 | B2 * | 9/2007 | Nagano | H02K 3/47 |
| | | | | 242/536 |
| 2005/0009418 | A1 * | 1/2005 | Ries | F01P 3/12 |
| | | | | 440/6 |
| 2009/0096313 | A1 | 4/2009 | Harada et al. | |
| 2009/0186535 | A1 * | 7/2009 | Sullivan | B60F 3/0007 |
| | | | | 440/6 |
| 2014/0319980 | A1 | 10/2014 | Iki | |
| 2016/0133371 | A1 | 5/2016 | Stefanescu | |
| 2019/0229594 | A1 * | 7/2019 | Kuemmlee | B63H 21/17 |
| 2020/0195104 | A1 * | 6/2020 | Bulatow | H02J 50/10 |
| 2020/0235626 | A1 * | 7/2020 | Kummlee | H02K 3/345 |

FOREIGN PATENT DOCUMENTS

| | | | |
|---|---|---|---|
| DE | 102009032882 B3 | 11/2010 | |
| DE | 102014207621 A1 | 10/2014 | |
| DE | 102015221923 A1 | 5/2017 | |
| DE | 102018204989 A1 * | 10/2019 | ............ H02K 3/28 |
| EP | 1742330 B1 | 9/2009 | |
| EP | 3451503 A1 * | 3/2019 | ............ H02K 3/12 |
| SU | 1690088 A1 | 11/1991 | |
| WO | WO 2013185839 A1 | 12/2013 | |
| WO | WO 2015130331 A1 | 9/2015 | |
| WO | WO 2017050447 A1 | 3/2017 | |

* cited by examiner

STATOR FOR AN ELECTRICAL ROTATING MACHINE

CROSS-REFERENCES TO RELATED APPLICATIONS

This application is the U.S. National Stage of International Application No. PCT/EP2018/070838 filed Aug. 1, 2018, which designated the United States and has been published as International Publication No. WO 2019/042690 A1 and which claims the priority of European Patent Application, Serial No, 17188366.3, filed Aug. 29, 2017, pursuant to 35 U.S.C. 119(a)-(d).

BACKGROUND OF THE INVENTION

The invention relates to a stator for an electrical rotating machine, in particular for use in a pod drive, which stator has a laminated stator core having coils.

The invention also relates to an electrical rotating machine having at least one such stator.

The invention further relates to a pod drive having at least one such electrical rotating machine.

Moreover, the invention relates to a watercraft, in particular a ship, having at least one such pod drive.

In addition, the invention relates to a method for manufacturing such a stator.

Such a stator is preferably used in an electrical rotating machine, in particular in a motor or generator, that is used in shipbuilding and has a power consumption of at least one megawatt.

The stator windings of such an electrical rotating machine are usually embodied as preformed coils. Preformed coils are, for example, produced from drawn semi-finished parts, in particular rectangular strips, which are then wound up, for example to form an oval, and then shaped tangentially into a final shape. A winding overhang is located on the ends of the preformed coil formed by bending and offsetting the preformed coil conductors. This winding overhang requires considerable axial installation space. The additional inactive conductor length of the winding overhang results in ohmic losses, which reduce the efficiency of the electrical rotating machine. It is moreover necessary to cool the winding overhangs. Additional installation space is required for cooling and maintaining the required insulation distances between the live coils.

In particular in the case of high-speed machines with a low number of coils, the increased bearing span caused by the winding overhangs has a detrimental effect on the rotor dynamics. The greater conductor lengths further necessitate complex reinforcing measures in order to prevent impermissible vibrations and deformations in operation and in the event of malfunctions, for example short circuits. Moreover, the overall length and weight of the electrical rotating machine are increased. In particular with a modular construction of large machines with which a plurality of submachines form an overall machine in the axial direction, the winding overhangs give rise to significant lengths that are not used for electrical purposes.

The patent DE 10 2009 032 882 B3 describes a method for manufacturing a preformed coil for a tiered winding of a dynamo-electric machine and a preformed coil manufactured by means of said method. To simplify the production of the preformed coil, it is produced from a raw coil, wherein the raw coil has two longitudinal sides provided in order to be inserted in grooves of a stand or a rotor of the dynamo-electric machine. The raw coil has two winding overhang sides that are each provided to form a winding overhang of the preformed coil, wherein the longitudinal sides are bent by 90° in order to insert the longitudinal sides into the grooves and to offset the winding overhang sides from the longitudinal sides.

The unexamined laid-open patent application DE 199 14 942 A1 describes a method for producing a stator winding for an electrical machine and a stator winding of this kind. The machine has salient poles. The ends of the coil conductors protrude over the laminated stator core in the axial direction and are fastened in module terminals. Conducting tracks forming windings with the conductors or extending from terminals to external connecting points are located on the modules.

The patent EP 1 742 330 BI describes a stator winding overhang for a stator part of a turbogenerator. The stator winding overhang is in the form of a disc with a central outlet for leading through a rotor, wherein the disc has an insulating main body in which is integrated an electrical connection for contacting a stator conductor. The contact is established in the form of a plug and/or with throughplating.

The unexamined laid-open patent application DE 10 2014 207 621 A1 discloses a stator of an electrical rotating machine including a stator core with a plurality of slots, a segmented winding with a plurality of phases and a plurality of base plates that are laminated at each end of the stator core in the axial direction. The stator core and a plurality of winding bars of the segmented winding form a stator core assembly. The plurality of base plates and plurality of end winding connections of the segmented winding form a plurality of base plate assemblies. The stator is configured by the stator core assembly and the plurality of base plate assemblies that are laminated at each end of the stator core assembly.

The unexamined laid-open patent application DE 10 2015 221 923 A1 describes an electrical machine that has a stator with an electrical winding having electrically conductive bars arranged in grooves of the stator and each of which has a first cross-sectional area in the region of the grooves and an inverter circuit for the controlled electrical energization of the winding, wherein the controlled electrical energization is electrically connected to the winding and/or the bars are electrically connected to one another by at least one circuit board arrangement.

The U.S. Pat. No. 1,653,784 A describes an electrical machine with a rotor provided with a plurality of axially arranged slots, wherein windings have bars arranged in the slots. Connectors connect the bars at the ends of the slots, wherein the connectors comprise substantially rectangular bars that are uniform in cross section throughout their length. The connecting bars consist of a plurality of strands which subdivide the bars in the direction of their width in a plane perpendicular to the axes of the slots, wherein the strands interlink in respect to each other so as to occupy different positions of the connecting bar they comprise while ensuring a uniform cross-sectional area of the latter.

The unexamined laid-open patent application US 2009/1096313 A1 describes a stator with a stator core having a plurality of slots in a direction parallel to the rotating shaft of a rotating electrical machine; and a coil plate body formed by laminating a plurality of I-shaped coil plates, each of which has an insulating film attached to at least one side in a direction of the diameter. A plurality of coil plates inserted in a resin insulator are inserted into the coil plate body so that the insulating film is arranged between the coil plates and the coil plates are held integrally by the resin insulator.

The unexamined laid-open patent application WO 2015/130331 A1 describes a device such as a coil with which each electrical conductor material is enclosed by a magnetic metal/material in order to amplify the entire magnetic field generated that is guided through a core in a closed loop and to align it in a desired direction.

The unexamined laid-open patent application WO 2017/050447 A1 describes an electrical rotating machine which has a rotor that can be rotated about a rotational axis with a rotor tube and a shaft stub, wherein the shaft stub is arranged on a non-operating side of the electrical rotating machine and wherein the rotor tube is mechanically connected to the shaft stub at an axial end of the rotor tube. To save space and reduce costs, it is suggested that the shaft stub has a central bore and/or parallel bores, which are provided for supplying a coolant into the rotor tube, wherein the rotor tube has at least one cooling opening and wherein the central bore and/or the parallel bores are fluidically connected to the at least one cooling opening connection.

The unexamined laid-open patent application WO 2013/185839 A1 describes a method for producing an optoelectronic semiconductor element comprising at least one first component and a second component, wherein a sintering material is applied to the first component, the second component is placed on the sintering material and the sintering material is sintered under the action of heat, pressure and ultrasound during a sintering time to form a connecting layer between the first and second component.

The invention is based on the object of providing a stator for an electrical rotating machine which, with a short axial length, has improved electrical and mechanical properties compared to the prior art.

SUMMARY OF THE INVENTION

According to the invention, the object is achieved by a stator for an electrical rotating machine having a laminated stator core having coils, wherein the coils each have at least one groove portion, at least one winding overhang portion and at least one connecting portion, wherein the winding overhang portion is designed as a stator winding overhang board, which is arranged at an end face of the laminated stator core and has conducting tracks integrated into an insulating main body, wherein in each case a conductor of the groove portion and a conducting track of the winding overhang portion are connected in a connecting portion, wherein the conductors of the groove portion each have a first number of partial conductors that are electrically insulated from each other and the conducting tracks of the winding overhang portion each have a second number of partial conducting tracks that are electrically insulated from each other and wherein the partial conductors of the groove portion that are electrically insulated from each other and the partial conducting tracks of the winding overhang portion that are electrically insulated from each other are electrically conductively connected in the connecting portion.

The object is furthermore achieved according to the invention by an electrical rotating machine having at least one such stator.

The object is further achieved according to the invention by a pod drive having at least one such electrical rotating machine.

The object is further achieved according to the invention by a watercraft, in particular a ship, having at least one such pod drive.

In addition, the object is achieved according to the invention by a method for manufacturing such a stator, wherein the at least one stator winding overhang board is placed on an end face of the laminated stator core and wherein thereupon the conductors of the groove portion and the conducting tracks of the winding overhang portion are connected, in particular with a material bond.

The above-described advantages and preferred embodiments in respect of the stator can be transferred analogously to the electrical rotating machine, the pod drive, the watercraft and the manufacturing method.

The invention is based on the idea of reducing the axial length of the stator of an electrical rotating machine with a power of at least one megawatt by redesigning the winding overhangs, which generally require a significant installation space. While the windings in the groove portion retain their conventional shape as coil bars, the winding overhangs are designed as winding overhang boards, which in particular lie on an end face of the laminated stator core in which conducting tracks are arranged, which connect the respective coil bars to each other. The conducting tracks are integrated in an insulating main body, wherein the insulating main body a establishes a thermally conductive connection between the conducting tracks and the laminated stator core. The conducting tracks are further encapsulated by the insulating main body and hence protected from environmental influences, such as moisture. The insulating main body contains a ceramic material, for example aluminum oxide or aluminum nitrite with a high thermal conductivity, in particular with a thermal conductivity of more than 5 W/mK. Alternatively, the insulating main body contains a plastic having portions of at least one ceramic material. In particular when using a plastic, it is additionally necessary to cool the conducting tracks, for example via cooling ducts. In order to optimize the electrical properties, in particular the losses, and to simplify cooling, a first number of partial conductors of the groove portion are electrically insulated from each other. Additionally or alternatively, the conducting tracks of the stator winding overhang board have a second number of partial conducting tracks that are electrically insulated from each other, which extend in the winding overhang board insulated from each other. The conductors embodied as coil bars in the groove portion and the conducting tracks of the stator winding overhang board are connected in an electrically conductive manner in a connecting portion. In order to minimize the number of connection points, the partial conductors of the groove portion that are electrically insulated from each other and/or the partial conducting tracks of the stator winding overhang board that are electrically insulated from each other are electrically connected in the connecting portion. This kind of short circuit of the partial conductor and/or partial conducting tracks significantly reduces the number of connection points and it is possible to select greater distances between the connection points thus simplifying the insulation of the individual windings from each other in the connecting portion.

In a preferred embodiment, the partial conductors that are electrically insulated from each other in the groove portion are twisted, in particular in the manner of a Roebel bar. Thus, the total number of individual partial conductors are exposed to the same magnetic boundary conditions over the axial length of the laminated stator core so that electrical losses are minimal.

In a further advantageous design, the conductors of the groove portion and the respective conducting tracks of the winding overhang portion are connected with a material bond in the connecting portion. A material-bonded connection is, for example, established by filling the connecting gap with a metal, in particular copper, by a cold spray method.

Alternatively, the material-bonded connection is established by sintering, soldering and/or welding. Such a material-bonded connection is durable, reliable and has low electrical and thermal resistance.

Particularly advantageously, the material-bonded connection is established using nanoparticles, in particular silver nanoparticles. Such nanoparticles have a melting point that is several hundred kelvin lower than that of the corresponding metal. For example, a homogeneous silver solder with good adhesion can be produced from silver nanoparticles at approximately 230° C., wherein, after solidification, the resulting silver has a melting point of 961° C. Such a material-bonded connection using nanoparticles is irreversible, i.e., the preceding connection does not also melt on the establishment of a subsequent connection of this type.

In a further advantageous design, metallic connecting elements are arranged in the connecting portion between the conductors of the groove portion and the respective conducting tracks of the winding overhang portion. The metallic connecting elements are in particular designed as intermediate plates for bridging the thickness of a main insulation.

Particularly advantageously, the metallic connecting elements are embodied as wedge-shaped. A wedge-shaped embodiment, in particular as wedge-shaped individual parts, enables the application of a preload force and is suitable for compensating tolerances.

In a further advantageous design, a coil has at least two windings, wherein the conductors of the respective winding, in particular in the groove portion, are electrically insulated from each other by a conductor insulation arranged in a meandering shape. The meander-shaped conductor insulation comes in one piece and can hence be installed quickly and inexpensively. Furthermore, alternate connection of the conducting tracks is enabled and this achieves a distance sufficient for the electrical insulation between the connection points of the conductor tracks without further insulation measures.

Particularly advantageously, cooling ducts are arranged in the stator winding overhang board. A liquid coolant flows through the cooling ducts for cooling during operation and dissipates the heat generated in the conducting tracks. In particular when using an insulating main body with low thermal conductivity, it is necessary to cool the conducting tracks of the stator winding overhang board via cooling ducts.

In a preferred embodiment, the partial conducting tracks are arranged, in particular equidistantly, around the cooling ducts. Such an arrangement causes the partial conducting tracks to be cooled substantially uniformly by the coolant, thus minimizing electrical losses in the stator winding overhang board.

In a further advantageous design, the stator winding overhang board is at least partially produced using an additive manufacturing method. Additive manufacturing methods are, for example, 3D printing and screen printing. For example, the insulating main body is produced with a 3D printing method or a screen-printing method and then the conducting tracks are cast, for example using a die-casting method. Alternatively, the conducting tracks are produced using a 3D printing method or a screen-printing method. The insulating main body is then attached, for example using a sintering method. An additive manufacturing method enables the implementation of complex and compact structures resulting in an, in particular axial, reduction in the size of the stator winding overhang board.

BRIEF DESCRIPTION OF THE DRAWING

The following describes and explains the invention in more detail with reference to the exemplary embodiments depicted in the figures, which show.

DETAILED DESCRIPTION OF PREFERRED EMBODIMENTS

Figure 1:
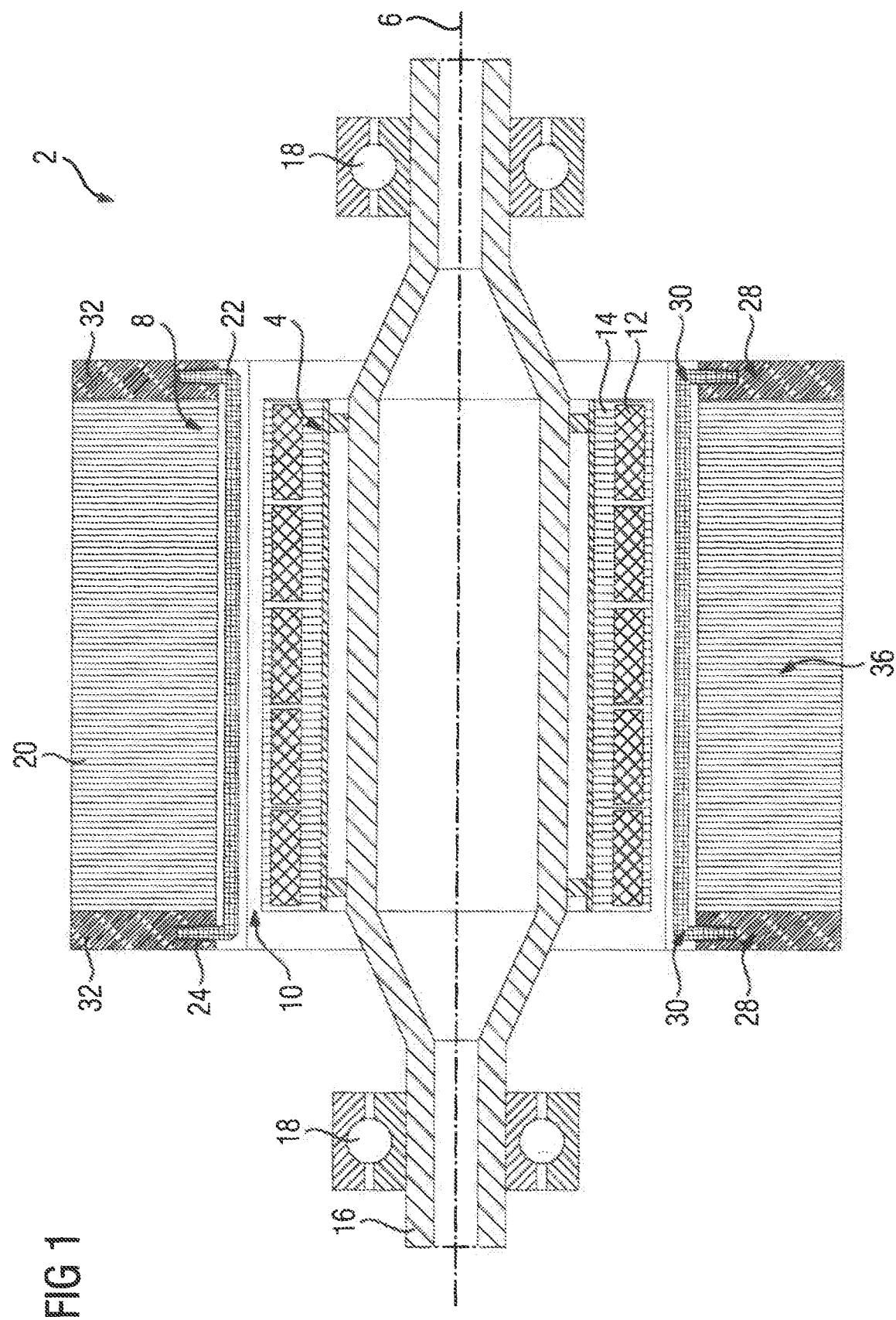
FIG. 1 a longitudinal section of an electrical rotating machine.

The same reference characters have the same meaning in the different figures.

FIG. 1 shows a longitudinal section of an electrical rotating machine 2 having a rotor 4 that can be rotated about an axis of rotation 6 and a stator 8 surrounding the rotor 4. A gap 10, preferably embodied as an air gap, is arranged between the rotor 4 and the stator 8. The axis of rotation 6 defines an axial direction, a radial direction and a circumferential direction. The electrical rotating machine 2 is embodied by way of example as a synchronous machine and has permanent magnets 12, which are at least partially integrated in at least one laminated stator core 14. The at least one laminated stator core 14 is connected in a rotationally fixed manner to a shaft 16, which is embodied by way of example as a hollow shaft and is supported by bearings 18 arranged on both sides.

The stator 8 has a laminated stator core 20 having coils 22, wherein the coils 22 extend in the axial direction through grooves 24 of the laminated stator core 20. Terminals of the coils 22, for example on a terminal box, are not shown for reasons of clarity. The coils 22, which are, for example, made of copper, have groove portions 26 and winding overhang portions 28, wherein a connecting portion 30 is arranged in each case between a groove portion 26 and a winding overhang portion 28. The winding overhang portions 28 of the coils 22 are arranged in stator winding overhang boards 32, which lie on the end faces 32 of the laminated stator core 16.

Figure 2:
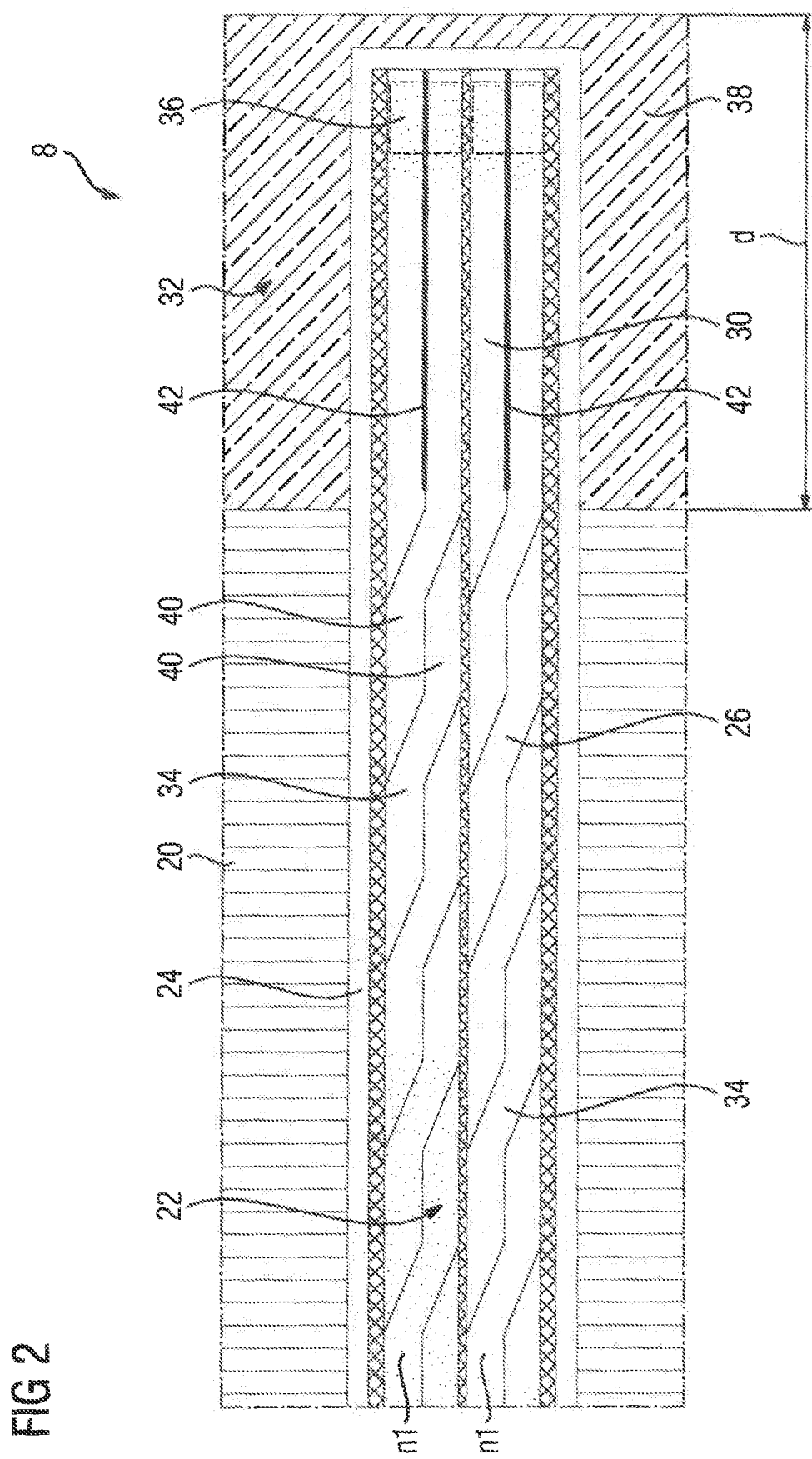
FIG. 2 an enlarged longitudinal section of a first embodiment of a stator in the region of a stator winding overhang board, FIG. 3 an enlarged cross section of a second embodiment of a stator in the region of a stator winding overhang board, FIG. 4 an enlarged section of a stator winding overhang board and FIG. 5 a ship with a pod drive.

FIG. 2 shows an enlarged longitudinal section of a first embodiment of a stator 8 in the region of a stator winding overhang board 32. A coil 22 extending through a groove 24 of the laminated stator core 20 has by way of example two windings each having a conductor 34 embodied as a coil bar. The conductors 34 in the groove portion 26 each have a first number n1 of partial conductors 40 that are electrically insulated from each other, which are twisted, in particular in the manner of a Roebel bar. The first number n1 of partial conductors 40 is at least 2 per conductor 34. In the connecting portion, the partial conductors 40 that are electrically insulated from each other are short circuited by an electrically conductive connection 42. The electrically conductive connection 42 is in particular embodied as a material-bonded connection. A material-bonded connection is, for example, established by filling the connection gap with a metal, in particular copper, using a cold spray method. Alternatively, the material-bonded connection is established by a pressureless sintering process, in particular at a temperature in the range of 200° C. to 300° C.

In a pressureless sintering process of this kind, the partial conductors 40 are joined with the aid of a bonding material, which, upon being heated develops nanoparticles, in particular silver nanoparticles, wherein, when more energy is supplied, a molten phase forms which, on subsequent solidification, creates an irreversible joint between the partial conductors 40. The joint is called irreversible because its melting point is much higher than that of the molten phase. In particular, the melting point of the cured joining material is in the region of the melting point of the metal used for the nanoparticles, for example, in the case of silver in the range of 900° C. to 1000° C. Therefore, the preceding joint does not also melt on the establishment of a subsequent joint of this kind.

Alternatively, the material-bonded connection is established by soldering or welding. The conducting tracks 36 of the stator winding overhang board 32 in the connecting portion 30 are also connected to the conductors 34 of the groove portion 26 by a material-bonded connection. The conducting tracks 36 are integrated in an insulating main body 38, wherein the insulating main body 38 establishes a thermally conductive connection between conducting tracks 36 and the laminated stator core 20. Furthermore, the conducting tracks 36 are encapsulated by the insulating main body 38. The insulating main body 38 contains a ceramic material, for example aluminum oxide or aluminum nitrite, with a high thermal conductivity, in particular a thermal conductivity of more than 5 W/mK. Alternatively, the insulating main body 38 contains a plastic, having portions of at least one ceramic material. In particular when using a plastic, it is additionally necessary to cool the conducting tracks 36, for example via cooling ducts.

The stator winding overhang board 32, which has a thickness d in the centimeter range, in particular in the range between 3 centimeters and 10 centimeters, is completely or at least partially produced using an additive manufacturing method. For example, the insulating main body 38 is produced with a 3D printing method or a screen-printing method and then the conducting tracks 36 are cast, for example using a die-cast method. Alternatively, the conducting tracks 36 are produced with a 3D printing method or a screen-printing method. The insulating main body 38 is then attached, for example using a sintering method. A further possibility for producing the stator winding overhang board 32 is to produce both the conducting tracks 36 and the insulating main body 38, preferably simultaneously, with a 3D printing method or a screen-printing method. The further embodiment of the stator 8 in FIG. 2 corresponds to the embodiment in FIG. 1.

Figure 3:
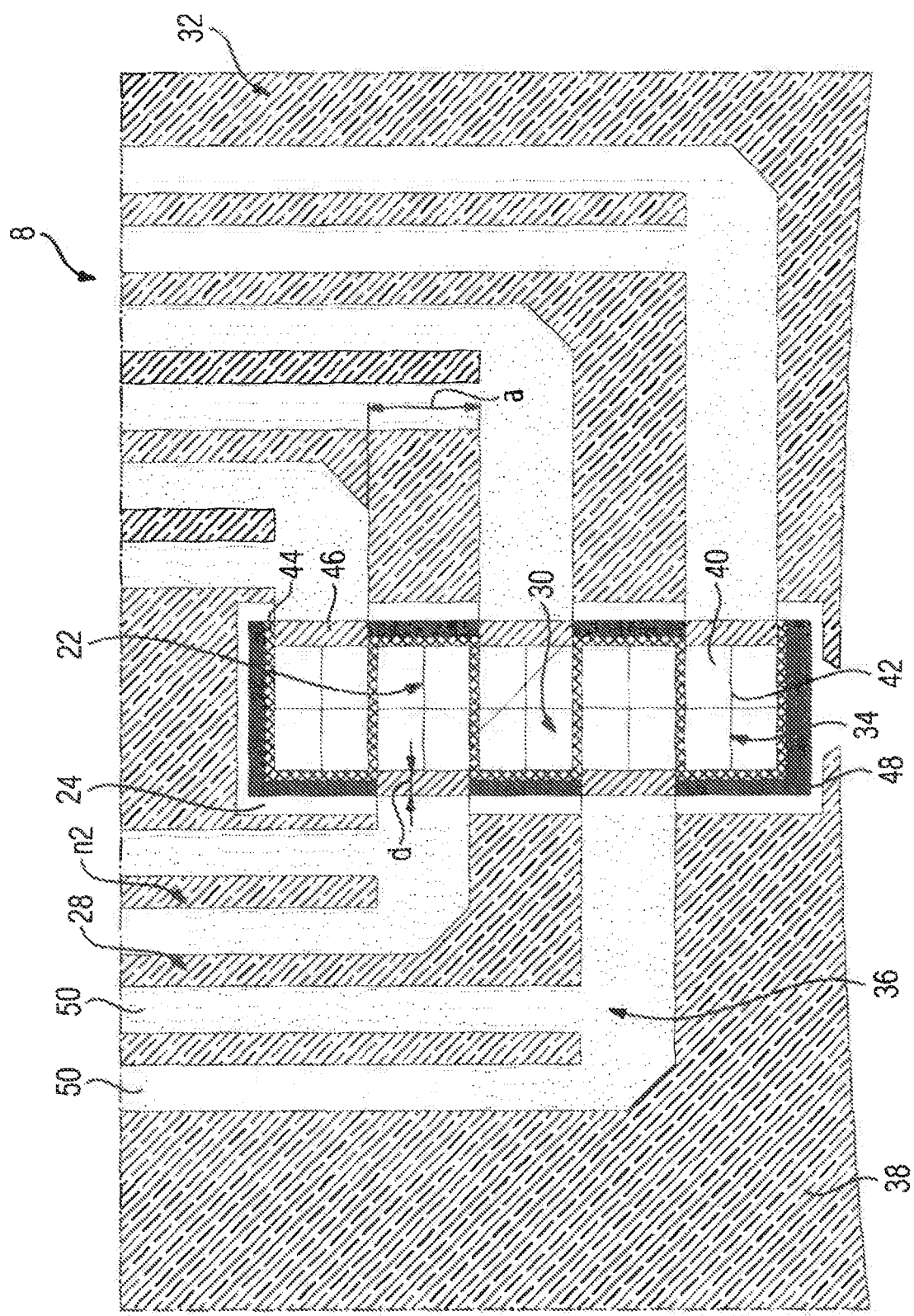

FIG. 3 shows an enlarged cross section of a second embodiment of a stator 8 in the region of a stator winding overhang board 32. A coil 22 extending through a groove 24 has by way of example five windings each having a conductor 34, wherein the windings are electrically insulated from each other by a conductor insulation 44 arranged in a meandering shape. Arranged between the conductors 34 and the respective conducting tracks 36 of the stator winding overhang board 32 are metallic connecting elements 46, which establish an electrically conductive connection in the connecting portion 30 between the conductors 34 and the respective conducting tracks 36. The metallic connecting elements 46 further bridge a thickness d of a main insulation 48. The metallic connecting elements 46 are embodied as individual parts. For the application of a preload force and/or to compensate tolerances, the metallic connecting elements 46 are designed as, in particular wedge-shaped, individual parts. Alternate connection of the conducting tracks 36 ensures an, in particular electrically, sufficient distance a between the connection points of the conducting tracks 36. In the winding overhang portion 28 within the stator winding overhang board 32, the conducting tracks 36 of a winding are each divided into a second number n2 of partial conducting tracks 50 in order to achieve improved mechanical properties and improved cooling of the partial conducting tracks 50 by enlarging a contact surface with the insulating main body 38. The second number n2 of partial conducting tracks 50 is at least 2 per conducting track 36. The further embodiment of the stator 8 in FIG. 3 corresponds to the embodiment in FIG. 2.

Figure 4:
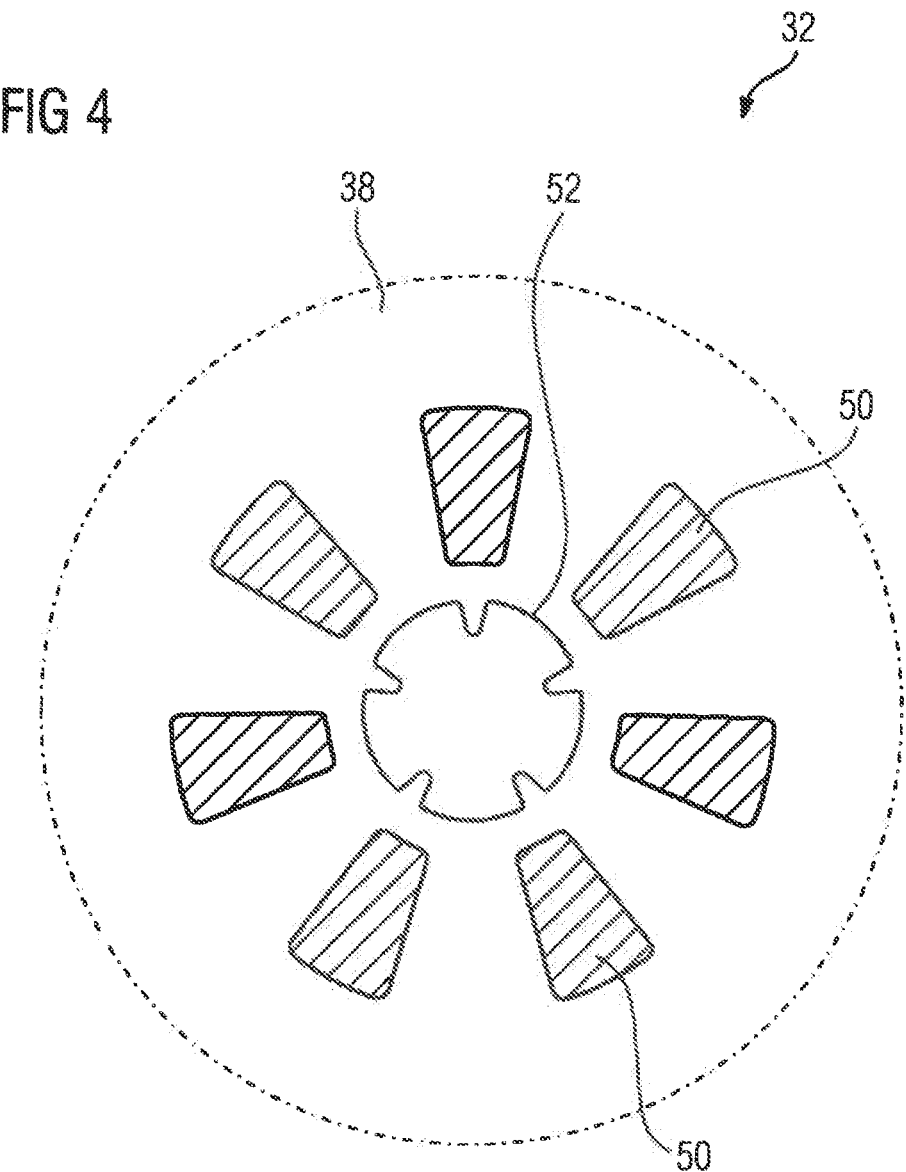

FIG. 4 shows an enlarged section of a stator winding overhang board 32 in which a cooling duct 52 is arranged. A coolant flows through the cooling duct 52. Partial conducting tracks 50, which by way of example have a ring-segment-shaped cross section, are arranged equidistantly around the cooling duct 52 and thus the partial conducting tracks 50 are cooled substantially uniformly by the coolant. The further embodiment of the stator winding overhang board 32 in FIG. 4 corresponds to the embodiment in FIG. 3.

Figure 5:
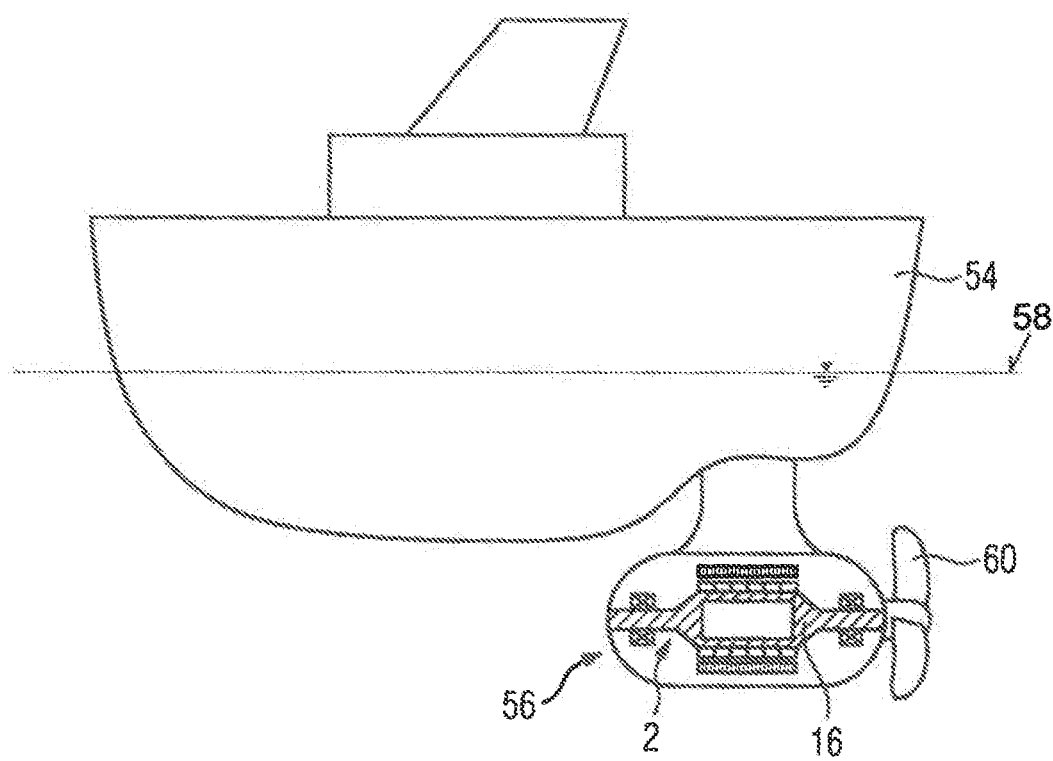

FIG. 5 shows a watercraft 54 with a pod drive 56. The pod drive 56 is located under a water surface 58 and has an electrical rotating machine 2 and a propeller 60, wherein the propeller 60 is connected to the electrical rotating machine 2 via a shaft 16. The use of a stator winding overhang board 32, which is not shown in FIG. 5 for reasons of clarity, endows the pod drive 56 with a short axial length.

To summarize, the invention relates to a stator 8 for an electrical rotating machine 2, in particular for use in a pod drive 56 having a laminated stator core 20 with coils 22. In order to achieve improved electrical and mechanical properties in comparison with the prior art while achieving a low axial length, it is suggested that the coils 22 each have at least one groove portion 26, at least one winding overhang portion 28 and at least one connecting portion 30, wherein the winding overhang portion 28 is designed as a stator winding overhang board 32, which is arranged at an end face of the laminated stator core 20 and has conducting tracks 36 integrated in an insulating main body 38, wherein in each case a conductor 34 of the groove portion 26 and a conducting track 36 of the winding overhang portion 28 are connected in a connecting portion 30, wherein the conductors 34 of the groove portion 26 each have a first number n1 of partial conductors 40 that are electrically insulated from each other and/or the conducting tracks 36 of the winding overhang portion 28 each have a second number n2 of partial conducting tracks 50 that are electrically insulated from each other and wherein the partial conductors 40 of the groove portion 26 that are electrically insulated from each other and/or the partial conducting tracks 50 of the winding overhang portion 28 that are electrically insulated from each other are connected to each other in an electrically conductive manner in the connecting portion 30.

The invention claimed is:

1. A stator for an electrical rotating machine, said stator comprising:

a laminated stator core having coils, each coil having a groove portion, a winding overhang portion and a connecting portion, said winding overhang portion configured as a stator winding overhang board arranged at an end face of the laminated stator core and having an insulating main body and conducting tracks integrated into the insulating main body, each of the conducting tracks formed by a number of partial conducting tracks that are electrically insulated from each other; and conductors extending in the groove portion, with each of the conductors formed by a number of partial conductors that are electrically insulated from each other, wherein each of the conductors and an associated one of the conducting tracks of the winding overhang portion are electrically conductively connected in the connecting portion.

2. The stator of claim 1, wherein the number of partial conductors is different from the number of partial conducting tracks.

3. The stator of claim 1, wherein the partial conductors are twisted.

4. The stator of claim 1, wherein the conductors in the groove portion and the conducting tracks of the winding overhang portion are connected with a material bond in the connecting portion.

5. The stator of claim 4, wherein the material bond is established using nanoparticles.

6. The stator of claim 1, further comprising metallic connecting elements arranged in the connecting portion between the conductors in the groove portion and the conducting tracks of the winding overhang portion.

7. The stator of claim 6, wherein the metallic connecting elements are wedge-shaped.

8. The stator of claim 1, wherein the coil has at least two windings, and further comprising a conductor insulation electrically insulating the conductors of a respective one of the windings.

9. The stator of claim 1, further comprising cooling ducts arranged in the stator winding overhang board.

10. The stator of claim 9, wherein the partial conducting tracks are arranged around the cooling ducts.

11. The stator of claim 1, wherein the stator winding overhang board is at least partially produced using an additive manufacturing method.

12. An electrical rotating machine, comprising a stator, said stator comprising a laminated stator core having coils, each coil having a groove portion, a winding overhang portion and a connecting portion, said winding overhang portion configured as a stator winding overhang board arranged at an end face of the laminated stator core and having an insulating main body and conducting tracks integrated into the insulating main body, each of the conducting tracks formed by a number of partial conducting tracks that are electrically insulated from each other, and conductors extending in the groove portion, with each of the conductors formed by a number of partial conductors that are electrically insulated from each other, wherein each of the conductors and an associated one of the conducting tracks of the winding overhang portion are electrically conductively connected in the connecting portion.

13. A pod drive, comprising an electrical rotating machine, said electrical rotating machine comprising a stator, said stator comprising a laminated stator core having coils, each coil having a groove portion, a winding overhang portion and a connecting portion, said winding overhang portion configured as a stator winding overhang board arranged at an end face of the laminated stator core and having an insulating main body and conducting tracks integrated into the insulating main body, each of the conducting tracks formed by a number of partial conducting tracks that are electrically insulated from each other, and conductors extending in the groove portion, with each of the conductors formed by a number of partial conductors that are electrically insulated from each other, wherein each of the conductors and an associated one of the conducting tracks of the winding overhang portion are electrically conductively connected in the connecting portion.

14. A watercraft, comprising a pod drive as set forth in claim 13.

15. A method for manufacturing a stator for an electrical rotating machine, said method comprising:

placing a winding overhang portion configured as a stator winding overhang board on an end face of a laminated stator core, with the stator winding overhang board having an insulating main body and conducting tracks integrated into the insulating main body, each of the conducting tracks formed by a number of partial conducting tracks that are electrically insulated from each other; and electrically conductively connecting conductors in a groove portion of a coil of the laminated stator core and the conducting tracks of the stator winding overhang board, with each of the conductors formed by a number of partial conductors that are electrically insulated from each other.

16. The stator of claim 1, wherein the partial conductors are twisted in a manner of a Roebel bar.

17. The stator of claim 4, wherein the material bond is established using nanoparticles.

18. The stator of claim 1, wherein the coil has at least two windings, and further comprising a conductor insulation arranged such that electrically insulating the conductors of a respective one of the windings in the groove portion.

19. The stator of claim 9, wherein the partial conducting tracks are arranged equidistantly around the cooling ducts.

20. The method of claim 15, wherein the conductors in the groove portion and the conducting tracks of the winding overhang portion of the coil are connected with a material bond.

* * * * *

UNITED STATES PATENT AND TRADEMARK OFFICE
CERTIFICATE OF CORRECTION

PATENT NO. : 11,031,836 B2
APPLICATION NO. : 16/642705
DATED : June 8, 2021
INVENTOR(S) : Horst Kümmlee Page 1 of 1

It is certified that error appears in the above-identified patent and that said Letters Patent is hereby corrected as shown below:

On the Title Page

Under (73) Assignee:
Replace "SIEMENS AKTIENGESELLDCHAFT" with correct --SIEMENS AKTIENGESELLSCHAFT--.

Under (30) Foreign Application Priority Data:
Replace "EP 17188366" with the correct --EP17188366.3--.

Under (56) Reference Cited:

Under FOREIGN PATENT DOCUMENTS:
Replace "DE 19914042 A1" with the correct --DE 19914942 A1--.

On page two
Under US PATENT DOCUMENTS:
Replace "US 20140319980 A1" with correct --US 20140319960 A1--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*